(12) United States Patent
Togersen et al.

(10) Patent No.: US 9,976,006 B2
(45) Date of Patent: May 22, 2018

(54) PROCESS FOR THE PREPARATION OF SOLID PARTICULATE VINYL AROMATIC POLYMER COMPOSITIONS

(71) Applicant: Averis AS, Sellebakk (NO)

(72) Inventors: Rune Togersen, Sellebakk (NO); Svein Togersen, Oslo (NO); Eckerhard Frahm, Vesteroy (NO)

(73) Assignee: Averis AS, Sellebakk (NO)

( * ) Notice: Subject to any disclaimer, the term of this patent is extended or adjusted under 35 U.S.C. 154(b) by 0 days. days.

(21) Appl. No.: 15/108,464

(22) PCT Filed: Dec. 30, 2014

(86) PCT No.: PCT/EP2014/079438
§ 371 (c)(1),
(2) Date: Jun. 27, 2016

(87) PCT Pub. No.: WO2015/101621
PCT Pub. Date: Jul. 9, 2015

(65) Prior Publication Data
US 2016/0326333 A1   Nov. 10, 2016

(30) Foreign Application Priority Data
Dec. 30, 2013 (EP) ..................................... 13199815

(51) Int. Cl.
| | |
|---|---|
| *C08G 63/02* | (2006.01) |
| *C08J 9/20* | (2006.01) |
| *C08F 257/02* | (2006.01) |
| *C08K 3/04* | (2006.01) |
| *C08K 5/00* | (2006.01) |
| *C08J 9/00* | (2006.01) |
| *C08J 9/14* | (2006.01) |
| *C08F 12/08* | (2006.01) |

(52) U.S. Cl.
CPC ............... *C08J 9/20* (2013.01); *C08F 12/08* (2013.01); *C08F 257/02* (2013.01); *C08J 9/0066* (2013.01); *C08J 9/141* (2013.01); *C08K 3/04* (2013.01); *C08K 5/0066* (2013.01); *C08J 2203/14* (2013.01); *C08J 2203/182* (2013.01); *C08J 2325/06* (2013.01)

(58) Field of Classification Search
USPC .......................................................... 521/60
See application file for complete search history.

(56) References Cited

U.S. PATENT DOCUMENTS

| | | | |
|---|---|---|---|
| 4,173,688 | A | 11/1979 | Saito et al. |
| 4,271,281 | A | 6/1981 | Kelley et al. |
| 4,525,519 | A | 6/1985 | Leising |
| 5,189,069 | A | 2/1993 | Speikamp et al. |
| 5,290,819 | A | 3/1994 | Witt et al. |
| 6,130,265 | A | 10/2000 | Glueck et al. |
| 6,362,242 | B1 | 3/2002 | Gluck et al. |
| 6,455,219 | B1 | 9/2002 | Chen |
| 6,660,814 | B1 | 12/2003 | Kroner et al. |
| 8,173,714 | B2 | 5/2012 | Datko et al. |
| 2014/0141314 | A1 | 5/2014 | Kaneda |
| 2015/0322182 | A1 | 11/2015 | Spies et al. |

FOREIGN PATENT DOCUMENTS

| | | |
|---|---|---|
| DE | 602203 | 2/2009 |
| EP | 0000572 | 7/1978 |
| EP | 0575672 | 6/1992 |
| EP | 0575872 | 6/1993 |
| EP | 0834518 | 1/1997 |
| EP | 1041108 A1 | 10/2000 |
| EP | 1247820 | 9/2002 |
| GB | 1 428 500 A | 3/1976 |
| WO | 1999016817 | 4/1999 |
| WO | 2003033579 | 4/2003 |
| WO | 2005123816 | 12/2005 |
| WO | 2010066331 A1 | 6/2010 |
| WO | 2010066454 A2 | 6/2010 |
| WO | 2013/005683 A1 | 1/2013 |
| WO | 2013092466 | 7/2013 |

OTHER PUBLICATIONS

PCT Written Opinion and International Preliminary Report on Patentability; dated Jul. 5, 2016; 9 pages.

*Primary Examiner* — Terressa Boykin
(74) *Attorney, Agent, or Firm* — Seyfarth Shaw LLP

(57) ABSTRACT

A novel process for preparing vinyl aromatic polymer particles is described. The particles and beads are suitable for being processed into foamed styrenic products of substantially improved insulation values, as well as other useful products.

16 Claims, 3 Drawing Sheets

PROCESS FOR THE PREPARATION OF SOLID PARTICULATE VINYL AROMATIC POLYMER COMPOSITIONS

FIELD OF THE INVENTION

The present invention relates to a novel process for preparing vinyl aromatic polymer particles, and more particularly it relates to a process for preparing expandable styrenic polymer beads containing athermanous additives. The particles and beads are suitable for being processed into foamed styrenic products having substantially improved insulation values, as well as other useful products. Herein, vinyl aromatic polymers and polymer compositions may likewise be generally denoted as styrenic polymers or polymer compositions pertaining to the presence of styrene building blocks.

BACKGROUND OF THE INVENTION

Expandable polystyrene of low thermal conductivity can be a useful insulation material in building and construction, wherein insulation boards are made from pre-expansion of beads of adequate particle size, block moulding and cutting. However, it can be problematic to directly prepare styrenic polymeric beads of a certain bead size range in a suspension polymerization process that can be used for production of expandable polymers, and poor mean bead size control results in less predictable output of particle sizes that can be used for block moulding, but also shape moulding. Inadequate particle sizes are considered off-grades.

U.S. Pat. No. 4,173,688 describes a process for preparation of expandable styrenic polymer particles of substantially narrow bead size distribution using polystyrene particles of narrow particle size distribution as seeds for seed polymerization with styrene. Such seed polymerization process enables production of expandable styrenic polymer beads of substantially narrow bead size distribution. However, the expanded and moulded styrenic polymer from this process has poor insulation properties.

U.S. Pat. No. 6,130,265 describes a suspension polymerization process for the preparation of polystyrene particles containing an athermanous agent and a foaming agent to reduce heat conductivity. However, a broad particle size distribution and poor mean particle size control result from inadequate suspension stability control.

WO 2010/066331 A1 describes a two-step process for producing expandable styrenic polymer beads using extruded styrenic polymer granulates and styrene monomer as main raw materials in a seed suspension polymerization process. However, the use of non-spherical oval shaped granulates with rough surface appearance as the styrenic polymer seed may possibly give suspension instability problems. This process requires a potentially more expensive extrusion step before the aqueous seed polymerization step in the reactor.

U.S. Pat. No. 5,189,069 describes a suspension polymerization process, wherein at least 70%, based on the total monomer, of the monomers are polymerized in an aqueous suspension initially to a conversion of at least 70% by weight, followed by gradually adding the last at most 30% of the total monomer in a seed polymerization. Incorporation of athermanous agent and the challenges associated therewith are not described.

Control of mean particle size, particle size distribution as well as exothermic reaction and suspension stability remain challenging issues in suspension polymerization of styrene. In particular, the incorporation of an athermanous agent in the formulation can have substantial adverse effects on these important parameters, making the process especially challenging as the use of conventional suspending agents, initiators and additives is impaired due to the substantial change of hydrophobicity of the polymer particles and inhibition of polymerization initiators.

Furthermore, there remains a challenge to produce expandable polystyrene with lower than four per cent content of foaming agent because of problems in terms of inadequate expansion performances and the inability to produce low density products.

There is a need in the art and thus it is the object of the invention to provide a fast, simple, robust and efficient process for the preparation of a solid particulate vinyl aromatic polymer composition with a substantially improved control of mean particle size and particle size distribution, wherein the polymer particles to be produced besides a polymer of vinyl aromatic monomer can beneficially contain athermanous agent, flame retardant and/or foaming agent. Furthermore, it is desirable that the pre-expansion capabilities and specific properties of the resulting foamed product are not adversely affected—even when an athermanous agent is present and/or even at low contents of foaming agent.

SUMMARY OF THE INVENTION

The object is solved by the processes according to claims 1, 14 and 15 and the use according to claim 16, while preferred embodiments are set forth in dependent claims and will be further described below.

The present invention in particular provides the following items including main aspects and preferred embodiments, which respectively alone and in combination particularly contribute to solving the above object and eventually provide additional advantages:

(1) A process for the preparation of a solid particulate vinyl aromatic polymer composition, wherein the process comprises:
  (i) providing an aqueous mixture comprising styrene and/or styrene derivative(s), a suspension stabilizer, at least one initiator and optionally a flame retardant, wherein the styrene and/or styrene derivative(s) content is less than 40 wt % with respect to the total weight of the mixture as provided in (i),
  (ii) polymerizing styrene and/or styrene derivative(s) of (i) via suspension polymerization to form seeds,
  (iii) subsequent to (ii) dosing of additional styrene and/or styrene derivative(s) and same or different at least one initiator to the formed aqueous suspension and further polymerizing styrene and/or styrene derivative(s) through seed polymerization to produce an aqueous suspension comprising at least 45 wt % of suspension organic phase with respect to the total weight of the suspension as present at the end of (iii).

(2) The process according to item (1), wherein the styrene and/or styrene derivative(s) content as provided in step (i) is less than 35 wt % with respect to the total weight of the mixture as provided in (i), preferably less than 30 wt %, more preferably between 5 and 30 wt %, even more preferably between 10 and 30 wt %, and most preferably between 20 and 30 wt %.

(3) The process according to item (1) or (2), wherein styrene and/or styrene derivative(s) as provided in step (i) are polymerized in step (ii) to a conversion of at least 60 wt %, preferably at least 65 wt %, more preferably at least 70 wt %, even more preferably at least 75 wt %, and most preferably at least 80 wt %.
(4) The process according to anyone of items (1) to (3), wherein in step (ii) at most 60% of the total styrene and/or styrene derivative(s) as provided in the overall process are polymerized, preferably at most 50%, more preferably at most 45%, even more preferably at most 40%, and still more preferably at most 35%.
(5) The process according to item (4), wherein styrene and/or styrene derivative(s) are polymerized by suspension polymerization, wherein optionally a surfactant is comprised, wherein the optional surfactant is contained in a concentration below the critical micellar concentration.
(6) The process according to anyone of items (1) to (3), wherein subsequent to step (ii) at least 50% of the total styrene and/or styrene derivative(s) as provided in the overall process are polymerized, preferably at least 55%, more preferably at least 60%, and even more preferably at least 65%.
(7) The process according to item (6), wherein subsequent to step (ii) styrene and/or styrene derivative(s) are polymerized by seed polymerization.
(8) The process according to anyone of the preceding items, wherein an athermanous agent is added to the aqueous mixture, preferably in step (i), wherein the athermanous agent is preferably added in an amount of 1-30 wt % with respect to the amount of styrene and/or styrene derivative(s) as provided in (i), preferably in an amount of 5-20 wt %, more preferably in an amount of 10-20 wt %, and more preferably in an amount of 13-15 wt %.
(9) The process according to anyone of the preceding items, wherein a blowing agent is added during and/or after the polymerization, preferably in step (iii) and/or after step (iii), to form expandable vinyl aromatic polymer.
(10) The process according to item (9), wherein the blowing agent is dosed simultaneously with styrene and/or styrene derivative(s) in step (iii).
(11) The process according to item (9) or (10), wherein the blowing agent is added in an amount such that the produced expandable vinyl aromatic polymer includes above 0 and up to 7 wt % blowing agent based on the total weight of the polymer composition, preferably from 2 wt % to 6 wt %, more preferably from 3 wt % to 4 wt %.
(12) The process according to anyone of items (9) to (11), wherein the blowing agent is pentane, preferably a mixture of iso-pentane and n-pentane.
(13) The process according to anyone of items (8) to (12), wherein the athermanous agent is solid particulate athermanous material, preferably is carbon black, and more preferably is lamp black.
(14) The process according to item (13), wherein the lamp black is characterized by either one or a combination of the following features:
  (a) having an amorphous and/or paracrystalline form of carbon;
  (b) having a surface area of 15 to 25 $m^2/g$;
  (c) having a low structure, preferably a dibutyl phthalate (DBP) absorption number of about 117 ml/100 g;
  (d) having primary particles in the range from 60 nm to 200 nm;
  (e) having an aggregate size of about 1 μm to 6 μm when dispersed in the vinyl aromatic polymer to be produced.
(15) The process according to item (13) or (14), wherein the athermanous agent is Lamp Black 101.
(16) The process according to anyone of the preceding items, wherein the at least one initiator in step (i) and/or (iii) comprises a non-aromatic initiator, preferably a Luperox type of initiator, more preferably Luperox V10, and most preferably 1,1-dimethylpropyl 1-methoxycyclohexyl peroxide.
(17) The process according to anyone of the preceding items, wherein the amount of the at least one initiator provided in step (i) is at most 50% of the total amount of initiator as provided in the overall process, preferably at most 45%, more preferably at most 40%, and even more preferably at most 35%.
(18) The process according to anyone of the preceding items, wherein the at least one initiator in step (i) is provided in an amount of 0.1-1.0 wt % with respect to the styrene and/or styrene derivative(s) as provided in (i), preferably is 1,1-dimethylpropyl 1-methoxycyclohexyl peroxide provided in an amount of 0.1-1.0 wt % with respect to the styrene and/or styrene derivative(s) as provided in (i).
(19) The process according to anyone of the preceding items, wherein the flame retardant is an organic flame retardant, preferably is a brominated polymeric flame retardant.
(20) The process according to anyone of the preceding items, wherein the flame retardant further comprises a flame retardant synergist.
(21) The process according to anyone of the preceding items, wherein a further additive is added before, during and/or after polymerization, wherein the additive is selected from the groups consisting of: co-monomer, waste polystyrene, thermoplastic polymer, nucleating agent, coupling agent, surfactant, hydrophilizer, pigment, dye, anti-lumping agent or anti-static agent.
(22) The process according to anyone of the preceding items, wherein the produced vinyl aromatic polymer exhibits an average molecular weight $M_w$ from 50,000 to 500,000 grams/mole, preferably from 100,000 to 300,000 grams/mole, as determined by gel permeation chromatography.
(23) The process according to anyone of the preceding items, wherein the coefficient of variation of the bead size of the vinyl aromatic polymer particles as produced is less than 30%, preferably less than 25%.
(24) The process according to anyone of the preceding items, wherein step (ii) is carried out in a temperature range from 85° C. to 130° C., preferably from 90° C. to 115° C., more preferably from 95° C. to 110°, and even more preferably from 100° C. to 108° C.
(25) The process according to anyone of items (1) to (23), wherein step (ii) is carried out above the glass transition temperature of the vinyl aromatic polymer.
(26) The process according to anyone of the preceding items, wherein step (ii) is carried out for at most 4 hours, preferably for at most 3.5 hours, more preferably for at most 3 hours, even more preferably for at most 2.5 hours, and yet even more preferably for at most 2 hours.
(27) The process according to anyone of the preceding items, wherein polymerizing in step (iii) is carried out in a temperature range from 85° C. to 130° C., preferably from 90 ° C. to 115° C., more preferably from 95° C. to 110°, and even more preferably from 100 ° C. to 109° C.
(28) The process according to anyone of items (1) to (26), wherein polymerizing in step (iii) is carried out above the glass transition temperature of the vinyl aromatic polymer.
(29) The process according to anyone of the preceding items, wherein polymerizing in step (iii) is carried out for at most 4 hours, preferably for at most 3.5 hours, more preferably for at most 3 hours, even more preferably for at most 2.5 hours, and yet even more preferably for at most 2 hours.

(30) The process according to anyone of the preceding items, wherein the mean bead size of the vinyl aromatic polymer particles as produced is at least 100 μm, more preferably at least 250 μm, even more preferably at least 500 μm, still more preferably at least 750 μm and particularly favourably at least 1.0 mm.

(31) The process according to anyone of items (9) to (30), further comprising pre-expansion of the expandable vinyl aromatic polymer.

(32) The process according to anyone of items (9) to (31), wherein when the expandable vinyl aromatic polymer includes 3-4 wt % of blowing agent the polymer is pre-expanded to below 20 kg/m$^3$.

(33) The process according to anyone of the preceding items, wherein subsequent to (iii) in an additional step (iv) further polymerizing of styrene and/or styrene derivative(s) is carried out until residual styrene and/or styrene derivative(s) is depleted to a predetermined concentration.

(34) The process according to anyone of the preceding items, wherein instead of preparing a solid particulate vinyl aromatic polymer composition a solid particulate acrylate polymer composition is prepared by providing and polymerizing an acrylic monomer, acrylate monomer and/or derivative(s) thereof instead of styrene and/or styrene derivative(s).

(35) A process for producing expanded/foamed polymer products, comprising the steps of
  (a) performing the process for the preparation of the solid particulate vinyl aromatic polymer composition according to anyone of items (9) to (33), and
  (b) expanding or foaming beads containing the blowing agent.

(36) A process for producing expanded/foamed polymer products, comprising the steps of
  (a) performing the process for the preparation of the solid particulate polymer composition according to item (34), and
  (b) expanding or foaming beads containing the blowing agent.

(37) Use of the process as defined in anyone of items (1) to (33) for producing any product selected from expandable polystyrene (co-)polymers (EPS), foamable polymers, antistatic polymers, thermoplastic polymers, and styrenic copolymers selected from GPS, SBS, HIPS and SAN.

DETAILED DESCRIPTION OF THE INVENTION

Figure 1:
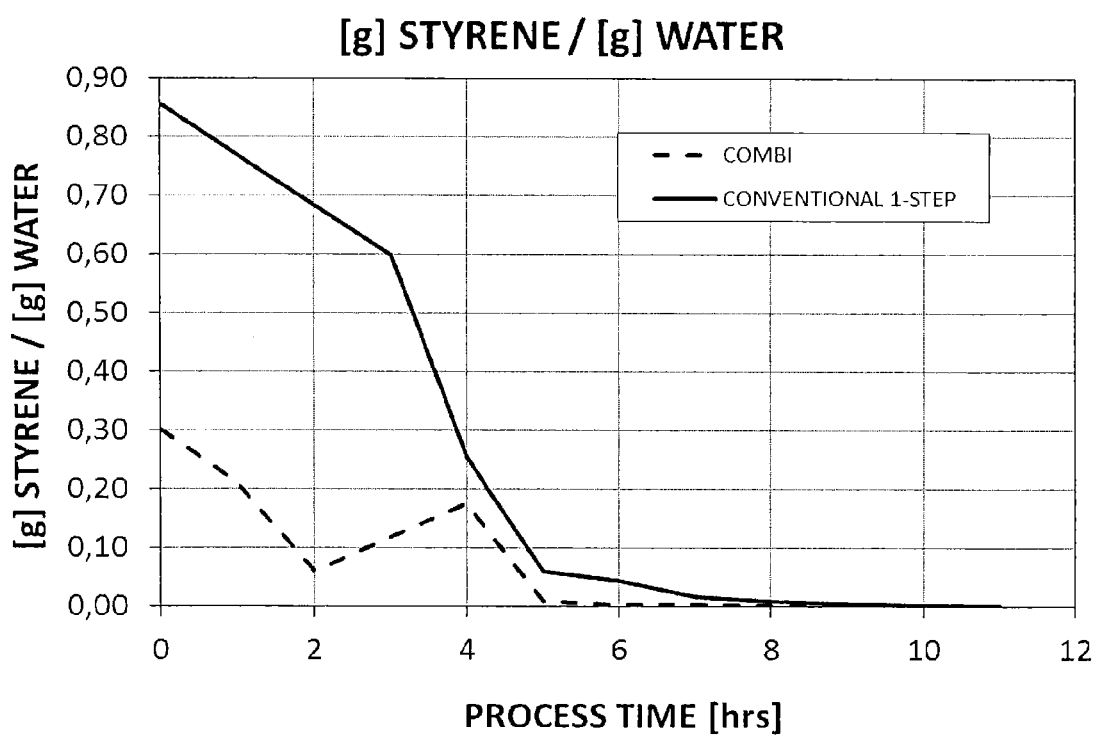
FIG. 1 shows an exemplary comparison between a conventional one-step suspension process and a combined two-stage process according to the invention (COMBI) for the styrene content relative to the amount of water in the suspension system as a function of process time.

In the following, the present invention is described in more detail while referring to preferred embodiments and examples, which are presented however for illustrative purposes and shall not be construed to limit the invention in any way.

A first aspect of the present invention is a process for the preparation of a solid particulate vinyl aromatic polymer composition, wherein the process comprises (i) providing an aqueous composition comprising styrene and/or styrene derivative(s), a suspension stabilizer, at least one initiator and optionally a flame retardant, wherein the styrene and/or styrene derivative(s) content is less than 40 wt % with respect to the total weight of the composition as provided in (i); (ii) polymerizing styrene and/or styrene derivative(s) of (i) via suspension polymerization to form seeds; and (iii) subsequent to (ii) dosing of additional styrene and/or styrene derivative(s) and same or different at least one initiator to the obtained aqueous suspension and further polymerizing styrene and/or styrene derivative(s) through seed polymerization to produce an aqueous suspension comprising at least 45 wt % of suspension organic phase with respect to the total weight of the suspension as present at the end of (iii).

Preferably, subsequent to (iii) in an additional step (iv) further polymerizing of styrene and/or styrene derivative(s) is carried out until residual styrene and/or styrene derivative(s) is depleted to a predetermined concentration.

It was surprisingly found that a fast, simple, robust and efficient industrial process for the preparation of a solid particulate vinyl aromatic polymer composition can be provided by carrying out steps (i) to (iii) as specified. Unexpectedly a facile process was found which provides excellent suspension stability and control of exothermic reaction with excellent heat transfer capability. Advantageously a substantially improved control of droplet/bead growth, in particular control of mean particle size, particle size distribution, average molecular weight and molecular weight distribution is obtainable. It was surprisingly found that the strong exothermic reaction can be kept under control by the present invention during the whole polymerization, even at eventually high organic phase in the suspension, and even at high initiator loads, and even more surprisingly in the presence of athermanous agent. The novel and advantageous process is based on a combination of a first stage using suspension polymerization of a relatively low proportion of styrene and/or styrene derivative(s) relative to water to form particular seeds and a second stage of further polymerization of styrene and/or styrene derivative(s) through seed polymerization. First and second stages of the process can be efficiently performed without interruption, yet the combination of the stages as specified provides for an improved control in terms of suspension stability, exothermic reaction, especially if additives such as athermanous agent, flame retardant and/or blowing/foaming agent is/are present. Suspension organic phase at end (iii) comprises vinyl aromatic polymer including additives, with or without foaming agent, and styrene and/or styrene derivative(s). Preferably, subsequent to (iii) further polymerization according to step (iv) is carried out.

In carrying out steps (i) and (ii) a suspension polymerization, wherein the forming or formed aqueous suspension is preferably stirred or agitated, is performed at a substantially reduced styrene and/or styrene derivative(s) to water ratio. In particular, styrene and/or styrene derivative(s) content provided in this first stage of the process is less than 40 wt % with respect to the total weight of the composition or mixture, which depending on the comprised constituents may be a dispersion of only liquids or a suspension, as provided in (i), preferably is less than 35 wt %, more preferably is less than 30 wt %, even more preferably is between 5 and 30 wt %, yet even more preferably is between 10 and 30 wt %, and most preferably is between 20 and 30 wt %. The present process beneficially provides both excellent heat transfer capability and droplet/bead growth control. Surprisingly, however, compared to a conventional process at such low styrene content in water not only could the mean bead size, bead size distribution and suspension stability be controlled and substantially improved. Furthermore an efficient overall process that is economically viable and attractive could be provided by combining this first stage suspension polymerization with a subsequent seed polymerization step.

Advantageously a controllable droplet/bead growth curve could be reached by reducing the amount/proportion of styrene, and the respective polystyrene content formed therefrom, to below 40 wt %, preferably below 35 wt %, and more preferably below 30 wt %, in the first stage comprising the suspension polymerization step of (i) and (ii). If styrene, and the associated respective polystyrene content, is higher, as is the case in conventional one-step suspension processes, droplet/bead growth is severely limited and may result in exceedingly small bead size and possibly also unfavourable broadening of the bead size distribution (see also Examples 1-3 and Comparative Examples 1 and 2). Alternatively, at high styrene and polystyrene to water ratio the amount of suspension stabilizers would need to be significantly reduced to achieve droplet/bead growth to a desirable and useful size, which would however cause a droplet/bead growth curve which is very difficult to control. A less controlled polymerization in an unstable suspension however leads to broad bead size distribution. Such broad particle size distribution and less predictable mean particle size stemming from inadequate suspension stability have adverse effects on productivity and safety in production. Furthermore, generally it is more difficult to achieve a stable suspension when producing large particle sizes compared to producing smaller particle sizes. Therefore, besides bead size growth, ensuring that the amount of styrene and/or styrene derivative(s), while allowing for a range of initiator concentrations, is relatively low compared to the amount of water at any time in this first stage of the process can advantageously contribute to improving heat transfer capability of the process. This means that the exothermal heat produced can be removed more effectively, wherein the aqueous phase serves as a heat transfer medium in the system. Hence a controllable process with stable suspension performance during the total polymerization can be provided. In a preferred embodiment the mean bead size of the vinyl aromatic polymer particles as produced is at least 100 µm, more preferably at least 250 µm, even more preferably at least 500 µm, still more preferably at least 750 µm and particularly favourably at least 1.0 mm. Herein, vinyl aromatic polymers and polymer compositions may likewise be generally denoted as styrenic polymers or polymer compositions pertaining to the presence of styrene building blocks.

Among other properties and provisions such as the nature of the provided initiator(s), the obtainable particle size can distinguish a suspension polymerization process and also the combi process according to the invention from emulsion polymerization. Particles obtained from emulsion polymerization are typically considerably smaller, ranging e.g. from 100 to 300 nm, wherein in the emulsion polymerization process a surfactant is used for chemical emulsification and reaction occurs in micelles formed by excess surfactant. By contrast, in suspension polymerization and the suspension polymerization step of the invention a suspension stabilizing agent is used. Furthermore, mechanical agitation can favourably contribute to dispersion and/or droplet formation, e.g. through shear forces. Optionally surfactant may be comprised, however generally in a concentration below the critical micellar concentration.

It is preferred that in step (ii) of the process styrene and/or styrene derivative(s) as provided in step (i) are polymerized to a conversion of at least 60 wt %, preferably at least 65 wt %, more preferably at least 70 wt %, even more preferably at least 75 wt %, and most preferably at least 80 wt %. In a preferred embodiment in the first polymerization phase using suspension polymerization a low amount of styrene and/or styrene derivative(s) relative to water is provided, for example below 30 wt % or around 23 wt % of styrene and/or styrene derivative(s), and polymerized until more than 80% of styrene and/or styrene derivative(s) is converted which is above the size identity point of the particles. Furthermore, subsequent dosing and further polymerization in step (iii) of the process are preferably carried out such that styrene conversion of at least 70 wt % is maintained.

According to the invention a relatively low amount of styrene and/or styrene derivative(s) is initially provided and polymerized in the dispersion or suspension. Preferably, in step (ii) at most 60% of the total styrene and/or styrene derivative(s) as provided in the overall process are polymerized, preferably at most 50%, more preferably at most 45%, even more preferably at most 40%, and still more preferably at most 35%. This means that subsequently to the first stage of the process at least 40%, preferably at least 50% of the total styrene and/or styrene derivative(s) as provided in the overall process are polymerized, more preferably at least 55%, even more preferably at least 60%, and still more preferably at least 65%. In particular, after finalizing the first polymerization phase having a relatively low styrene/water ratio, the second polymerization phase is initiated, preferably through styrene dosage over 60 to 120 minutes and further initiator dosing, and proceeds by seed polymerization until suspension organic phase content of at least 45 per cent is reached.

Preferably, the residual styrene level is kept below a maximum of around 30%, more preferably below around 20%, during and after the styrene dosage period such as to maintain and/or further control suspension stability and bead size distribution from the first polymerization phase. Preferably, the coefficient of variation of the bead size of the vinyl aromatic polymer particles as produced is less than 30%, preferably less than 25%. Bead size and bead size distribution are determined using sieve analysis described in standard DIN 66165-2 (1987-04). Further suitable methods to determine bead size and bead size distribution are also known, e.g. light microscopy or laser scattering and diffraction techniques. The ability to set and adjust the bead size and to furthermore obtain a narrow bead size distribution is very useful in that beads can be efficiently produced which are optimal for desired products and product performances while avoiding or at least minimizing the amount of off-grade particles. This provides benefits in terms of further processing and process economics.

FIG. 1 shows an exemplary comparison between a conventional one-step suspension process and a combined two-stage process according to the invention for the styrene content relative to the amount of water in the suspension system as a function of process time. According to the invention the amount of styrene present at any time during the polymerizations is kept comparatively low. This can provide benefits in terms of controlling and dissipating the heat evolved from the exothermic reaction, which in turn contributes to improving suspension stability and to obtaining a narrower particle size distribution. Surprisingly, despite the low styrene content the production time can be favourably shorter and the product output can be at least adequate or compatible in terms of polymer amount produced and favourable in terms of target bead size and bead size distribution compared to a conventional one-step suspension process with high styrene loading.

Figure 2:
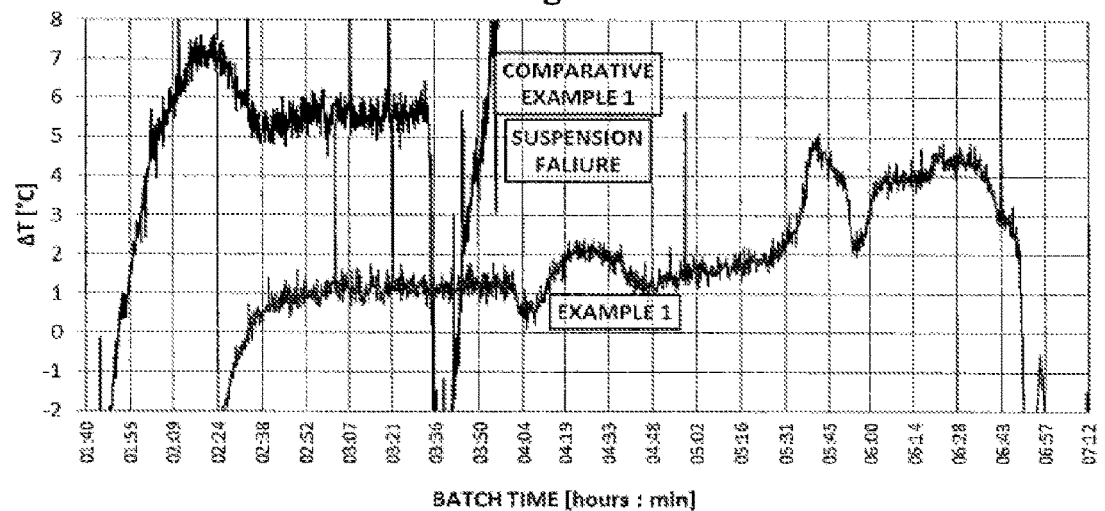
FIG. 2 shows exemplary ΔT(° C.) curves as a function of process time, wherein ΔT(° C.) is the temperature in the reactor medium minus the temperature of the cooling fluid in the temperature regulation unit, for combined two-stage processes according to the invention and as comparison for conventional one-step suspension processes.
Figure 2:
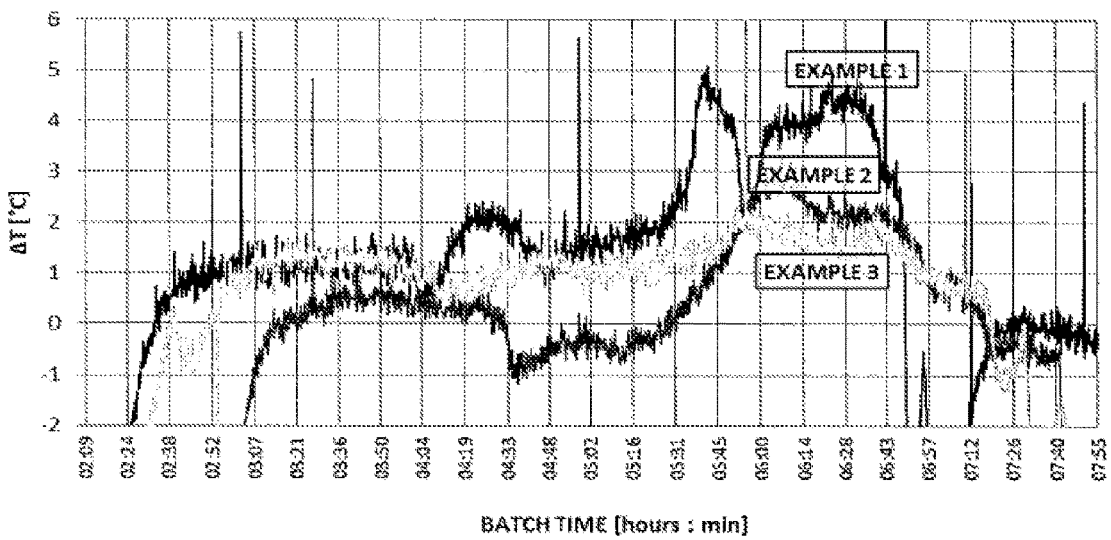
Figure 2:
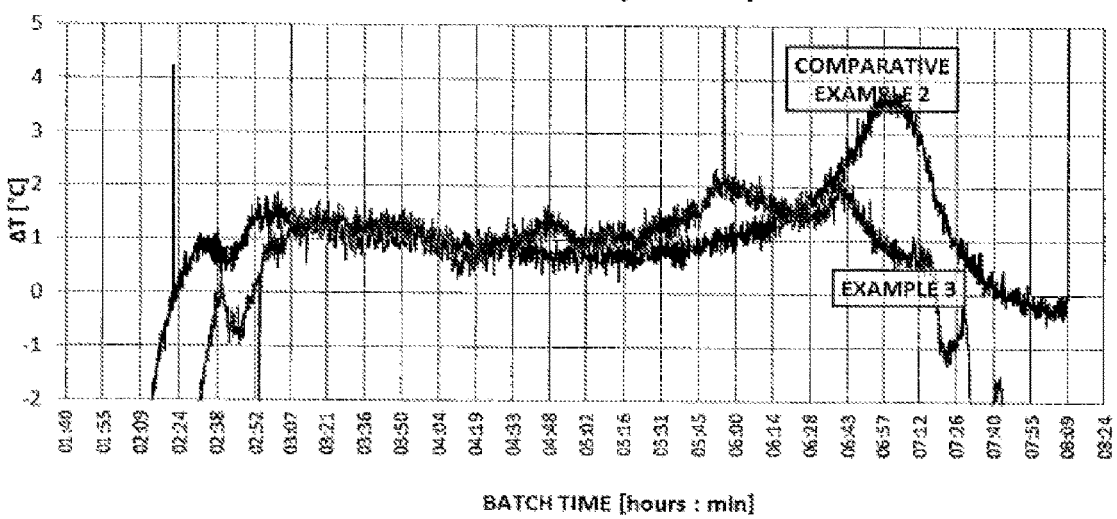

FIG. 2 shows exemplary $\Delta T(° C.)$ temperature profiles of Examples and Comparative Examples, i.e. it shows $\Delta T(° C.)$ as a function of process time for combined two-stage processes according to the invention and conventional one-step suspension processes. $\Delta T(° C.)$ is defined as the temperature in the reactor medium minus the temperature of the cooling fluid, in particular silicon oil, in the temperature regulation unit. In a particular embodiment an apparatus system is used wherein the cooling fluid is circulated to and from the "reactor jacket" to heat/cool the reactor content. The difference between the temperature in the reactor medium and of the cooling fluid in the reactor jacket is the driving force for heat transfer through the reactor wall. It is directly related to the exothermic heat produced in the processes. As can be derived from FIG. 2 the heat flow and thus the exothermic heat is significantly less in the inventive combi process compared to the conventional one-step suspension process. This is especially the case when athermanous agent, in particular lamp black, is used in comparable or similar amounts. This provides significant benefits in terms of process control and suspension stability. FIG. 2 also shows that the heat flow and thus the exothermic heat increases with increasing amount of lamp black. The comparison of the process according to the invention with a conventional one-step suspension process is likewise applicable as comparison with the process as proposed in U.S. Pat. No. 5,189,069 because, at least in terms of exothermal control, the primary stage of said process in U.S. Pat. No. 5,189,069 essentially corresponds to a conventional one-step suspension process.

Figure 3:
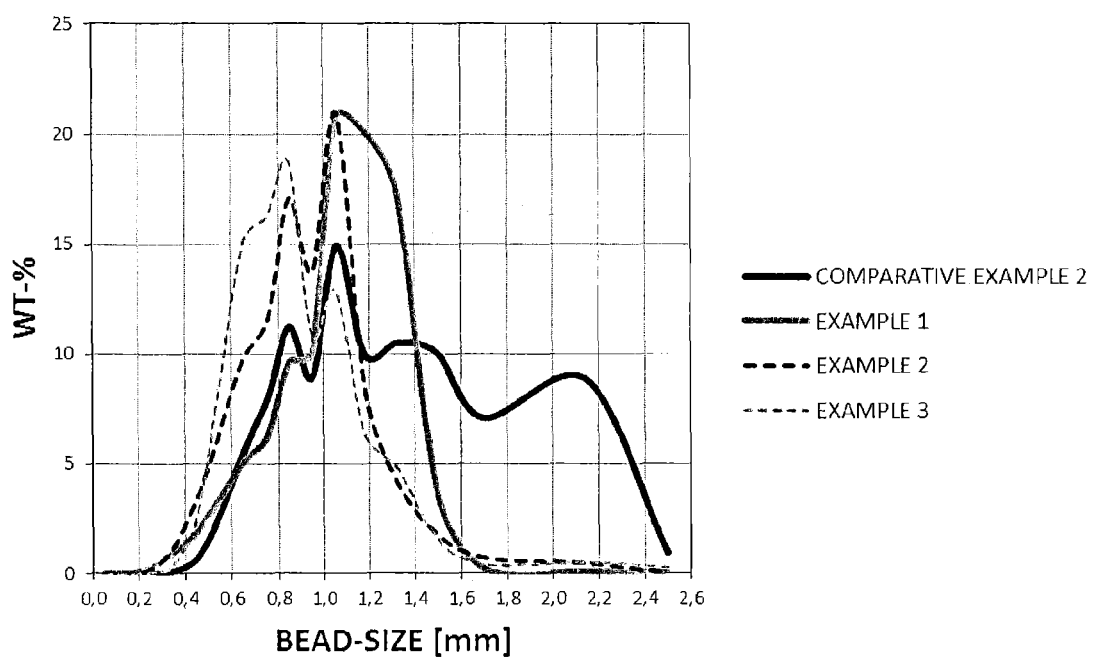
FIG. 3 shows exemplary comparisons for the bead size distribution of particles prepared by combined two-stage processes according to the invention and by a conventional one-step suspension process.

FIG. 3 exemplarily compares bead size distributions for particle compositions prepared by combined two-stage processes according to the invention in contrast to a conventional one-step suspension process. As can be seen in FIG. 3, for Comparative Example 2, i.e. for the conventional process the distribution is much broader (see also Table 1), with a considerable proportion tailed or skewed towards the larger size end. This means a significant proportion of the particles prepared by the conventional process may be considered as off-grade and may not be useable for particular applications. By contrast, for the process according to the invention narrow bead size distributions are favourably obtainable, while at the same time a useful target size can be reached. Surprisingly and advantageously this can even be achieved when athermanous agent is added.

Preferably an athermanous agent is added to the aqueous mixture, i.e. aqueous dispersion or suspension. In particular, the athermanous material is preferably provided in step (i) and incorporated into the forming seeds during the suspension polymerization in (ii). Preferably, the athermanous agent is pre-dispersed in styrene monomer. The loading of athermanous material can be variable. When athermanous material is provided in step (i), preferably 1-30 wt % of athermanous material with respect to the amount of styrene and/or styrene derivative(s) as used in (i) is provided, more preferably 5-20 wt %, even more preferably 10-20 wt %, and yet more preferably 13-15 wt %. It is especially advantageous and surprising that a high loading of athermanous material can be incorporated into the particles. Thus, even with the subsequently carried out seed polymerization, in case no further athermanous agent is added, the finally obtained beads still contain a sufficient amount of athermanous material to provide a desirable low-lambda value and efficient insulation performance with sufficiently reduced thermal conductivity, e.g. around 5 wt % of athermanous material in the final beads. Surprisingly, in the first stage of the process a high amount of athermanous agent, e.g. 13 wt % or even 15 wt %, can be incorporated while easily coping with the exothermic reaction and maintaining a stable suspension and producing final particles with a narrow size distribution in an overall short process time (see also Examples 1 and 2, FIG. 3).

Generally incorporation of athermanous agent in the formulation can be problematic because the thermal profile and behaviour of the suspension can be changed and furthermore the functionalities of e.g. suspending agents, initiators and additives can be changed, impaired or inhibited, potentially leading to suspension instabilities. It is therefore unexpected and advantageous that in the process according to the invention athermanous agent can be incorporated easily and fast in a simple manner, and even in a high load. Moreover, control of the exothermic reaction and suspension stability could be surprisingly maintained despite the presence of athermanous material, which would be expected to generally have a destabilizing effect.

This beneficial outcome is exemplified in Examples 1 and 2 and can be compared with Comparative Example 1. In Comparative Example 1 suspension failure occurred in the presence of athermanous agent and suspension coalescence was observed. This shows that heat transfer of the high exothermal heat in the conventional one-step process is poor in the presence of athermanous agent. The limitation in heat transfer in the conventional one-step process thus limits the amount of athermanous agent that can be added in the conventional suspension process. By contrast, in the process according to the invention control of the exothermic reaction and suspension stability can be maintained for various contents of athermanous agent (see also Table 1). This demonstrates that the combi process according to the invention has significantly better heat transfer compared to the conventional one-step process at similar athermanous agent content. Surprisingly the exothermic heat can be favourably controlled and managed. The favourable narrow bead size distribution obtainable by carrying out the process of the invention confirms this observation in that it is based, at least in part, on advantageous and stable suspension conditions. While eventually limited by a practical upper bound, surprisingly high amounts of athermanous agent can thus be added, preferably in the first step of the process, without causing intolerable heat transfer problems (see e.g. Example 1). However, also in the absence of athermanous material, i.e. without adding athermanous material, the combi process according to the present invention provides significant and useful advantages. In particular, also in the absence of athermanous material a narrow bead size distribution can be obtained (see Example 3 in FIG. 3), which confirms favourable suspension stability during the process (see Example 3 in FIG. 2), while at the same time enabling to reach desirable and useful particle size (see also Table 1).

In applications of EPS seeking to provide improved insulation values, the content of athermanous agent typically needs to be increased. To compensate for the poorer heat transfer within the general limitations of the reactor in terms of cooling capability, in conventional suspension polymerization the EPS/water ratio may need to be reduced accordingly. This means however a lowering in productivity and an increase in production cost. By contrast, the combi process according to the invention favourably enables to provide higher EPS/water ratios, thus in turn providing benefits in terms of process efficiency, productivity and cost.

The athermanous agent preferably is solid particulate athermanous material, more preferably is carbon black, and even more preferably is lamp black. In a preferred embodiment the lamp black is characterized by either one or a combination of the following features: having an amorphous and/or paracrystalline, preferably amorphous, form of carbon; having a BET surface area of 15 to 25 $m^2/g$; having a low structure, preferably a dibutyl phthalate (DBP) absorption number of about 117 ml/100 g; having primary particles in the range from 60 nm to 200 nm; and having an aggregate size of about 1 μm to 6 μm when dispersed in the vinyl aromatic polymer to be produced. In a particularly preferred embodiment the athermanous agent is Lamp Black 101.

Preferably a blowing agent, more preferably pentane, even more preferably a mixture of iso-pentane and n-pentane is added during and/or after the polymerization to form expandable vinyl aromatic polymer. In a preferred embodiment the blowing agent is added in step (iii) and/or step (iv). It was surprisingly found that the blowing agent can in particular be dosed simultaneously with styrene and/or styrene derivative(s) in step (iii). This provides significant advantages in terms of handling as well as process time and control, while not adversely affecting process stability. Preferably the blowing agent is added in an amount such that the produced expandable vinyl aromatic polymer includes above 0 and up to 7 wt % blowing agent based on the total weight of the polymer composition, more preferably from 2 wt % to 6 wt %, and even more preferably from 3 wt % to 4 wt %. The term "expandable" or "foamable" means that a blowing or foaming agent is present in the particulate polymer composition.

Advantageously a low amount of blowing agent such as pentane can be used, while still providing adequate expansion properties of expandable polystyrene. In an embodiment the process further comprises pre-expansion of the expandable vinyl aromatic polymer. Surprisingly it was found that the combination of process steps according to the invention can provide a polymer suspension of 45% or more suspension organic phase content which produced an expandable polymer wherein the key pre-expansion performances and the key foamed product properties could be adjusted and controlled, especially molecular weight and molecular weight distribution that represent major factors for designing expandable polystyrene processing performances. In particular, a low content of blowing/foaming agent is sufficient because adequately low molecular weight polystyrene can be produced because of the control of the strong exothermic reaction, while maintaining in the overall process a competitive styrene/water ratio of the suspension. Preferably, the produced vinyl aromatic polymer exhibits an average molecular weight $M_w$ from 50,000 to 500,000 grams/mole, preferably from 100,000 to 300,000 grams/mole, as determined by gel permeation chromatography. In a preferred embodiment, an expandable vinyl aromatic polymer including 3-4 wt % of blowing agent is produced, wherein the polymer can be pre-expanded to below 20 $kg/m^3$.

Advantageously, the present invention provides a facile and flexible process for the preparation of solid vinyl aromatic polymer particles, wherein the process can be varied easily such that athermanous agent may or may not be contained in the particles and/or that blowing agent may or may not be contained in the particles. Additionally one or more flame retardants, preferably also flame retardant synergist, is (are) optionally added to the composition, which can be used in an amount of preferably 0.5-10 wt %, more preferably ca. 1 wt %, with respect to the total weight of the entire composition. Preferably the flame retardant is an organic flame retardant, more preferably is a brominated polymeric flame retardant, e.g. selected from the Emerald series of brominated polymeric flame retardants. In a particularly preferred embodiment the brominated polymer Emerald 3000 is used. Suitable flame retardants may also be selected from the group consisting of known halogenated and non-halogen fire retardation substances, such as chlorinated and brominated fire or flame retardants, peroxides, phosphorous compounds or mixtures thereof, without being limited thereto. Examples include, without being limited thereto, brominated compounds, hexabromcyclododecan (HBCD), phosphate compounds such as triphenylphosphate (TPP), and others such as polyphenylenoxide/ether and the like.

The inventive process enables flexible production for various products, wherein the product output can be easily adjusted to the desired outcome, e.g. white PS, white EPS, grey PS and grey EPS, etc. Optionally a further additive is added before, during and/or after polymerization, wherein the additive is selected from the groups consisting of: co-monomer, waste polystyrene, thermoplastic polymer, nucleating agent, coupling agent, surfactant, hydrophilizer, pigment, dye, anti-lumping agent or anti-static agent. The process thus gives improved diversification potentials, e.g. with regard to presence, type and amount of athermanous agent, initiators, flame retardant system, additives, fillers etc., having potential to satisfy future demand for improved product performances.

The present invention provides further benefits in that existing equipment conventionally used in suspension polymerization and/or seed polymerization of vinyl aromatic polymer particles can be used for the present continuous combined in situ two-stage process. Optionally an adjustment to the equipment can be carried out to allow for the dosing in step (iii). In a preferred embodiment, in step (iii) styrene and/or styrene derivative(s), initiator and optionally blowing/foaming agent are gradually dosed in a speed that maintains residual styrene below around 20% at any time in step (iii), and optionally also step (iv).

Preferably the at least one initiator in step (i) and/or (iii) comprises a non-aromatic initiator, more preferably a Luperox type of initiator, and most preferably 1,1-dimethylpropyl 1-methoxycyclohexyl peroxide. In a preferred embodiment the amount of the at least one initiator provided in step (i) is at most 50% of the total amount of initiator as provided in the overall process, more preferably at most 45%, even more preferably at most 40%, and yet even more preferably at most 35%. Surprisingly it was found that even when athermanous agent such as lamp black is added to the suspension or mixture an effective and efficient polymerization and stable suspension were obtainable despite the presence of athermanous agent. Preferably the at least one initiator in step (i) is provided in an amount of 0.1-1.0 wt with respect to the styrene and/or styrene derivative(s) as provided in (i), preferably is 1,1-dimethylpropyl 1-methoxycyclohexyl peroxide provided in an amount of 0.1-1.0 wt % with respect to the styrene and/or styrene derivative(s) as provided in (i).

Advantageously, despite the relatively low amount of styrene and/or styrene derivative(s) in the suspension or mixture in the first stage of the combined process, a relatively high initial loading of initiator provided in step (i) can lead to even faster conversion and fast seed formation, while at the same time producing relatively low molecular weight polymer. Also in the presence of athermanous material, and surprisingly even when a high amount of athermanous material is provided in the suspension or mixture, a fast and efficient polymerization is obtainable, wherein the athermanous material is efficiently incorporated into the beads, even at high loading. When the athermanous material is provided in step (i) and incorporated into the seed particles during suspension polymerization according to step (ii), it is possible to control that the final particles after the subsequent seed polymerization can exhibit an inhomogeneous distribution of athermanous material, wherein the core portion of the particles has a higher concentration of athermanous material compared to the outer and shell portions, wherein athermanous material may even be absent or essentially absent from a surface layer. Embodiments where the athermanous material is absent or essentially absent from a surface layer may be advantageous depending on the desired application, such as e.g. fusion capabilities, avoidance of unintentional release and dust formation, etc.

In the process, during the polymerizations a temperature is maintained that is sufficient to polymerize styrene. Preferably, step (ii) and the polymerization in step (iii) are carried out in a temperature range from 85° C. to 130° C., more preferably from 90° C. to 115° C., even more preferably from 95° C. to 110°, and yet even more preferably from 100° C. to 109° C. In a preferred embodiment both the suspension polymerization and the subsequent seed polymerization are carried out above the glass transition temperature of the vinyl aromatic polymer. This way a further improved control of the exothermic reaction and better heat dissipation/conductivity and improved suspension stability are obtainable.

Despite the relatively low styrene and/or styrene derivative(s) concentration provided in the mixture, i.e. dispersion or respectively suspension, in step (i), the overall combined process but also the first and second stages of the process each alone can proceed surprisingly fast, while still achieving compatible and economically attractive product yield and output. Surprisingly, the overall combined, continuous process can be faster than a conventional one-step suspension polymerization process using a conventionally high styrene loading. Preferably, step (ii) and polymerizing in step (iii) respectively are respectively carried out for at most 4 hours, more preferably for at most 3.5 hours, even more preferably for at most 3 hours, yet even more preferably for at most 2.5 hours, and still even more preferably for at most 2 hours. The amounts of initiators used and gradual dosing of monomer and reduced swelling can lead to improvements in process time.

The monomers used as raw materials in the present invention comprise vinyl aromatic monomers such as styrene, but although styrene monomer is a most preferred embodiment, the present invention of course is not limited to a monomer of styrene as raw material. Accordingly, the monomers used to prepare the (co-)polymers, i.e. polymers and/or copolymers, can be selected from the group of vinyl monomers, preferably from the group consisting of styrene or styrene derivatives such as C1-3-alkyl substituted styrenes, halogenated styrenes; (meth)acrylic acid or (meth) acrylate, ethyl acrylate, butylacrylate, maleic acid and esters thereof, maleic anhydride, fumaric acids and esters thereof and acrylonitrile, without being limited thereto. Therefore, in another aspect of the invention there is provided a process, wherein instead of preparing a solid particulate vinyl aromatic polymer composition a solid particulate acrylate polymer composition is prepared by providing and polymerizing according to the invention an acrylic monomer and/or acrylate monomer and/or derivative(s) thereof instead of styrene and/or styrene derivative(s). Particulate acrylate polymer compositions can provide benefits in terms of for example transparency as well as mechanical properties such as resistance to breakage and elasticity, and durability and weather resistance in outdoor applications. In a particularly preferable embodiment the particles comprise poly(methyl methacrylate) (PMMA) and/or poly(methyl acrylate) (PMA), most preferably PMMA. Particularly preferably PMMA is the only vinyl polymer contained in the particles, which optionally further comprise blowing agent to give expandable PMMA. Athermanous agent can preferably and favourably be comprised.

Suspension stabilizer provided in (i) can be selected from the group of water soluble organic polymers such as for example partially hydrolyzed polyvinyl alcohol or polyvinyl pyrrolidone, or from the group of finely inorganic salts from Mg, Ca, Al and clays, with or without additional surfactant. In case surfactant is additionally comprised it is contained in a concentration below the critical micellar concentration, preferably well below the critical micellar concentration. The preferred inorganic salt is magnesium pyrophosphate in combination with a surfactant.

The dry foamable styrenic polymer beads may be surface-coated with chemicals, typically anti-lumping agent such as zinc stearate, and other organic stearates to enable smooth processing to produce insulation boards of substantially enhanced insulation property.

Advantages of the process reside inter alia in the ability to maintain suspension stability and to control and adjust the exothermic reaction, the molecular weight and molecular weight distribution, the bead size and bead size distribution. In the case of incorporating athermanous agent, dust formation and exposure is reduced. The obtainable solid content and process time and thus productivity and capacity are favourable, while being energy efficient and producing low amount of off-grade particles, leading to favourable production costs. The ability to produce low-lambda/grey and/or low pentane EPS provides further environmental benefits. The overall process efficiency is based on the advantageous combination of the suspension polymerization as specified to form seeds in a controlled and favourable manner in a first stage followed by seed polymerization in the same reactor in the same process. Furthermore, since according to the present invention expandable styrenic polymer beads can be produced under a substantially controlled polymerization regime, a narrow bead size distribution can be obtained as a significant improvement over a conventional one-step suspension polymerization process. A further advantage resides in that foamable styrenic polymer beads of narrow bead size distribution can be produced at a wide range of respectively selected mean bead size windows as desired, and thus the foamable styrenic polymer beads are accessible to the wide application areas of the final product.

In another aspect a process for producing expanded/foamed polymer products is provided which comprises the steps of performing the process for the preparation of the solid particulate vinyl aromatic polymer composition according to the invention and expanding or foaming beads containing the blowing agent. Pre-expansion and block moulding can be performed as is conventional in the art.

A further aspect of the invention is a use of the process of the invention for producing any product selected from expandable polystyrene (co-)polymers (EPS), foamable polymers, antistatic polymers, thermoplastic polymers, and styrenic copolymers selected from GPS, SBS, HIPS and SAN.

EXAMPLES AND COMPARATIVE EXAMPLES

In the following the invention is further illustrated by Examples and Comparative Examples, further demonstrating significant improvements in terms of suspension stability and particle size distribution (see also Table 1 and FIGS. 2 and 3).

Comparative Example 1

To a stirred reactor 2061 g demineralized water, 8.29 g tetrasodium pyrophosphate, 35.0 g magnesium sulphate heptahydrate were charged. 41 mg potassium persulphate, 1.85 g polyethylene wax, 10.24 g tricalcium phosphate and 1.23 g disodium phosphate were charged. Monomer solution comprising 1746 g styrene, 5.54 g 1,1-dimethylpropyl 1-methoxycyclohexyl peroxide (Luperox V-10 from Arkema), 18.45 g brominated polymer (Emerald 3000 from Chemtura), 9.23 g dicumyl peroxide and 92 g carbon black (Lamp Black 101 from Orion Engineered Carbon GmbH) was added. The suspension was heated to 109° C. and kept at this temperature for 95 minutes polymerization. 131 g pentane, with composition 80% n-pentane:20% iso-pentane and containing 3.39 g tert-butylperoxy 2-ethylhexyl carbonate (Luperox TBEC from Arkema) was charged before heating to 125° C. Upon reaching 125° C. temperature suddenly increased to 132° C. (high exothermal heat) and the suspension coalesced. The ΔT curve is shown in FIG. 2. (ΔT=Temperature (reactor medium)−Temperature (cooling/heating bath)). The particle analysis is shown in Table 1.

Comparative Example 2

To a stirred reactor were charged 1608 g demineralized water, 3.37 g tricalcium phosphate and 6.7 mg potassium persulphate. 1588 g styrene, 6.72 g 75%-dibenzoyl peroxide, 2.21 g polyethylene wax, 5.89 g hexabromocyclododecane and 4.45 g dicumyl peroxide were added. The reactor was closed and pressurized with 0.5 bar nitrogen blanket and heated to 92° C. After 304 minutes on 92° C., a mixture of 15 g deionized water and 5.8 g of tricalcium phosphate was added. After 354 minutes at 92° C. the reactor was cooled down to room temperature. The ΔT curve is shown in FIG. 2. (ΔT=Temperature (reactor medium)−Temperature (cooling/heating bath)). The particle analysis is shown in Table 1 and FIG. 3.

Example 1

To the stirred reactor comprising 1976 g demineralized water were added 82 mg potassium persulphate, 8.29 g tetrasodium pyrophosphate, 35.0 g magnesium sulphate heptahydrate, 10.24 g tricalcium phosphate, 1.23 g disodium phosphate and 1.85 g polyethylene wax.

A first monomer solution comprising 615 g styrene, 2.15 g 1,1-dimethylpropyl 1-methoxycyclohexyl peroxide (Luperox V-10 from Arkema), 18.45 g brominated polymer (Emerald 3000 from Chemtura), 9.23 g dicumyl peroxide and 92.0 g carbon black (Lamp Black 101 from Orion Engineered Carbon GmbH) were charged to the reactor. The suspension was heated to 109° C. and remained at this temperature for 95 minutes. The suspension was stabilized with 0.42 g sodium dodecyl benzene sulphonate dissolved in 42 g water before continuing the process.

Subsequently, a monomer solution comprising 1131 g styrene, 3.39 g 1,1-dimethylpropyl 1-methoxycyclohexyl peroxide (Luperox V-10 from Arkema), and 1.24 g tert-butylperoxy 2-ethylhexyl carbonate (Luperox TBEC from Arkema) was charged over 180 minutes. 131 g pentane (80% n-pentane/20% iso-pentane) was dosed during the last 30 minutes of the above styrene/initiator dosing. The suspension was then heated to 125° C. to reduce residual styrene monomer content. The ΔT curve is shown in FIG. 2. (ΔT=Temperature (reactor medium)−Temperature (cooling/heating bath)). The particle analysis is shown in Table 1 and FIG. 3.

Example 2

To the stirred reactor comprising 2047 g demineralized water were added 40 mg potassium persulphate, 0.31 g tetrasodium pyrophosphate, 4.60 g magnesium sulphate heptahydrate, 4.83 g tricalcium phosphate, 0.27 g disodium phosphate and 0.62 g polyethylene wax.

A first monomer solution comprising 615 g styrene, 2.15 g 1,1-dimethylpropyl 1-methoxycyclohexyl peroxide (Luperox V-10 from Arkema), 18.45 g brominated polymer (Emerald 3000 from Chemtura), 9.23 g dicumyl peroxide and 46.0 g carbon black (Lamp Black 101 from Orion Engineered Carbon GmbH) was charged to the reactor. The suspension was heated to 109° C. and remained at this temperature for 90 minutes. The suspension was stabilized with a mixture of 0.75 g sodium dodecyl benzene sulphonate dissolved and 5 g tricalcium phosphate and 50 g water before continuing the process.

Subsequently, a monomer solution comprising 1131 g styrene, 3.39 g 1,1-dimethylpropyl 1-methoxycyclohexyl peroxide (Luperox V-10 from Arkema), and 1.24 g tert-butylperoxy 2-ethylhexyl carbonate (Luperox TBEC from Arkema) was charged over 180 minutes. 131 g pentane (80% n-pentane/20% iso-pentane) was dosed during the last 30 minutes of the above styrene/initiator dosing. The suspension was heated to 125° C. to reduce residual styrene monomer content, and cooled to room temperature. The ΔT curve is shown in FIG. 2. (ΔT=Temperature (reactor medium)−Temperature (Cooling/Heating bath)). The particle analysis is shown in Table 1 and FIG. 3.

Example 3

To the stirred reactor comprising 2047 g demineralized water were added 18 mg potassium persulphate, 0.14 g tetrasodium pyrophosphate, 0.73 g magnesium sulphate heptahydrate, 0.29 g disodium phosphate, 6.61 g tricalcium phosphate and 0.62 g polyethylene wax. A first monomer solution comprising 615 g styrene, 2.15 g 1,1-dimethylpropyl 1-methoxycyclohexyl peroxide (Luperox V-10 from Arkema), 18.45 g brominated polymer (Emerald 3000 from Chemtura) and 9.23 g dicumyl peroxide were charged to the reactor. The suspension was heated to 109° C. and remained at this temperature for 90 minutes, after which 6.0 g tricalcium phosphate, 15 g deionized water and 86 mg sodium dodecyl benzene sulphonate was added.

Subsequently, a monomer solution comprosing 1131 g styrene and 3.39 g 1,1-dimethylpropyl 1-methoxycyclohexyl peroxide (Luperox V-10 from Arkema), 1.24 g tert-butylperoxy 2-ethylhexyl carbonate (Luperox TBEC from Arkema), was charged over 180 minutes. 133 g pentane (80% n-pentane/20% iso-pentane) was dosed during the last 30 minutes of the above styrene/initiator dosing. The suspension was heated to 125° C. to reduce residual styrene monomer content. The ΔT curve is shown in FIG. 2. (ΔT=Temperature (reactor medium)−Temperature (cooling/heating bath)). The particle analysis is shown in Table 1 and FIG. 3.

Example 4

White EPS/PS having substantially low pentane, wherein the polymer can be pre-expanded to 20 g/L or below, can be prepared by the Combi process according to the invention, wherein the suspending agent type applied in Comparative Example 2 is used and where no carbon black/athermanous agent is added and that a lower amount of pentane is dosed.

In Comparative Example 2 athermanous agent was not included. The obtained particle/bead size distribution was relatively broad (see Table 1), with a considerable proportion tailed or skewed towards the larger size end (see FIG. 3).

The one-step process of Comparative Example 1 including athermanous agent gave suspension failure, with relatively small mean bead size before coalescence of the suspension.

Surprisingly, Example 1 and Example 2 gave improved control over particle/bead size distribution despite the presence of an athermanous agent. Large mean particle size could be obtained with symmetrical bead size distributions (see Table 1 and FIG. 3). Exotherm control in the presence of athermanous agent was favourable (see FIG. 2). Example 3 was carried out without adding athermanous agent, wherein white EPS was obtained with favourable particle size and size distribution in a well controlled process (see FIGS. 2 and 3).

Mean particle size and particle size distribution were determined using sieving analysis described in standard DIN 66165-2 (1987-04).

As illustrated by the Examples and contrasted with the Comparative Examples, the present invention provides a controllable process with substantially improved suspension stability demonstrated through substantially narrower particle size distribution and size control of polymer particles containing a polymer of vinyl-aromatic monomer and optionally flame retardant and/or foaming agent, even when including athermanous agent. Also, the present invention provides a process for producing low pentane low density EPS.

TABLE 1

Experimental parameters and Results from Comparative Examples 1 and 2, and from Examples 1, 2 and 3.

| | COMPARATIVE EXAMPLE 1 | COMPARATIVE EXAMPLE 2 | EXAMPLE 1 | EXAMPLE 2 | EXAMPLE 3 |
|---|---|---|---|---|---|
| Process Type | 1-step | 1-step | Combi | Combi | Combi |
| Lamp Black [%-styrene] | | | | | |
| Step (i + ii) | | 0 | 15.0 | 7.5 | 0 |
| End Step (iii) | | 0 | 5.3 | 2.7 | 0 |
| FINAL | 5.3 | 0 | 5.3 | 2.7 | 0 |
| Polymerization temperature [° C.] | 109 | 92 | 109 | 109 | 109 |
| Initiator pure [%-total styrene] | Luperox V-10 | BPO | Luperox V-10 | Luperox V-10 | Luperox V-10 |
| Step (i + ii) | | | 0.11 | 0.11 | 0.11 |
| Step (iii) | | | 0.18 | 0.18 | 0.18 |
| FINAL | 0.29 | 0.32 | 0.29 | 0.29 | 0.29 |
| Suspension Stabilizer [%-water] | 2.8 | 0.9 | 2.8 | 0.9 | 0.7 |
| Blowing agent [%-total weight polymer composition] | 6.54 | 0 | 6.53 | 6.69 | 6.85 |
| Styrene/Polystyrene content, Step (i + ii) [%-total suspension weight] | | | 20.9 | 20.9 | 21.5 |
| Organic Phase, Step (iii) [%-total suspension wt. end Step(iii)] | | | 49.2 | 48.1 | 47.9 |
| FINAL | 48.6 | 49.3 | 49.2 | 48.1 | 47.9 |
| Styrene Step (i + ii) [%-total styrene] | | | 35.2 | 35.2 | 35.2 |
| See FIG. 2 for actual ΔT curves | | | | | |
| ΔT (° C.) after 0 min | 0 | 0 | 0 | 0 | 0 |
| ΔT (° C.) after 60 min | 5.5 | 1.1 | 1.1 | 0.3 | 1.2 |
| ΔT (° C.) after 120 min | 6.0 | 0.9 | 2.0 | −0.3 | 1.2 |
| ΔT (° C.) after 180 min | Suspension failure. | 0.7 | 2.3 | 2.5 | 1.5 |
| ΔT (° C.) after 240 min | | 1.3 | 4.5 | 0.2 | 1.5 |
| ΔT (° C.) after 300 min | | 2.5 | | | |
| D' [mm] | <0.4 during 109° C. phase. | 1.20 | 1.04 | 0.91 | 0.88 |
| CV [%] | | 36.8 | 24.8 | 28.2 | 28.1 |

ΔT = Temperature (reactor) − Temperature (cooling/heating bath), CV = Coefficient of Variation calculated by (Standard Deviation)/(Mean bead Size) * 100, D' = mean bead size, 1-step = start with 100% of the total styrene, Combi = start with <60% of the total styrene in Step (i + ii) and polymerize the rest >40% of the styrene in Step (iii) seed polymerization (the process of this invention).

The invention claimed is:

1. A process for the preparation of a solid particulate vinyl aromatic polymer composition, wherein the process comprises:
(i) providing an aqueous mixture comprising styrene and/or styrene derivative(s), a suspension stabilizer, and at least one initiator;
wherein the styrene and/or styrene derivative(s) content is less than 40 wt % with respect to the total weight of the mixture as provided in (i);
(ii) polymerizing the styrene and/or styrene derivative(s) of (i) via suspension polymerization to form seeds, and
(iii) subsequent to (ii), dosing of additional styrene and/or styrene derivative(s) and a same or different at least one initiator to the formed aqueous suspension and further polymerizing styrene and/or styrene derivative(s) through seed polymerization to produce an aqueous suspension comprising at least 45 wt % of suspension organic phase with respect to the total weight of the suspension as present at the end of (iii).

2. The process according to claim 1, wherein the styrene and/or styrene derivative(s) content as provided in step (i) is less than 35 wt % with respect to the total weight of the mixture as provided in (i).

3. The process according to claim 1, wherein the styrene and/or styrene derivative(s) as provided in step (i) are polymerized in step (ii) to a conversion of at least 60 wt %.

4. The process according to claim 1, wherein in step (ii) at most 60% of the total styrene and/or styrene derivative(s) are polymerized.

5. The process according to claim 1, further comprising adding an athermanous agent to the aqueous mixture, in step (i) in an amount of 1-30 wt % with respect to the amount of styrene and/or styrene derivative(s) as provided in (i).

6. The process according to claim 1, further comprising adding a blowing agent during and/or after the step of polymerizing to form an expandable vinyl aromatic polymer, wherein the blowing agent is added in an amount such that the expandable vinyl aromatic polymer includes above 0 and up to 7 wt % blowing agent based on the total weight of the solid particulate vinyl aromatic polymer composition.

7. The process according to claim 6, wherein the blowing agent is dosed simultaneously with the styrene and/or styrene derivative(s) in step (iii).

8. The process according to claim 5,
wherein the athermanous agent is lamp black, and
wherein the lamp black is characterized by either one or a combination of the following features:
(a) having an amorphous and/or paracrystalline form of carbon;
(b) having a surface area of 15 to 25 $m^2$/g;
(c) having a dibutyl phthalate (DBP) absorption number of about 117 ml/100 g;
(d) having primary particles sized in a range from 60 nm to 200 nm; and
(e) having an aggregate size of about 1 μm to 6 μm when dispersed in the vinyl aromatic polymer.

9. The process according to claim 1, wherein the at least one initiator in step (i) and/or (iii) comprises a non-aromatic initiator.

10. The process according claim 1, wherein the step of providing further includes providing an organic flame retardant.

11. The process according to claim 1, wherein the vinyl aromatic polymer exhibits an average molecular weight $M_w$ from 50,000 to 500,000 grams/mole, as determined by gel permeation chromatography.

12. The process according to claim 1, wherein the step (ii) and the step of polymerizing in step (iii) are carried out above a glass transition temperature of the vinyl aromatic polymer.

13. The process according to claim 1, further comprising, subsequent to step (iii), a step (iv) of polymerizing styrene and/or styrene derivative(s) until residual styrene and/or styrene derivative(s) are depleted to a predetermined concentration.

14. A process for the preparation of a solid particulate acrylate polymer composition, wherein the process comprises:
(i) providing an aqueous mixture comprising an acrylic monomer, an acrylate monomer and/or derivative(s), a suspension stabilizer, and at least one initiator;
wherein the acrylic monomer, acrylate monomer and/or derivative(s) content is less than 40 wt % with respect to the total weight of the mixture as provided in (i);
(ii) polymerizing the acrylic monomer, acrylate monomer and/or derivative(s) of (i) via suspension polymerization to form seeds; and
(iii) subsequent to (ii), dosing of additional acrylic monomer, acrylate monomer and/or derivative(s) and a same or different at least one initiator to the formed aqueous suspension and further polymerizing the acrylic monomer, acrylate monomer and/or derivative(s) through seed polymerization to produce an aqueous suspension comprising at least 45 wt % of suspension organic phase with respect to the total weight of the suspension as present at the end of (iii).

15. A process for producing expanded and/or foamed polymer products, comprising the steps of:
(a) performing a process for the preparation of the solid particulate vinyl aromatic polymer composition according to claim 6, and
(b) expanding or foaming beads containing the blowing agent.

16. A process for preparing expandable polystyrene (co-)polymers (EPS), foamable polymers, antistatic polymers, thermoplastic polymers, and styrenic copolymers selected from GPS, SBS, HIPS and SAN, wherein the process comprises the steps of claim 1.

* * * * *